(12) United States Patent
Folk et al.

(10) Patent No.: US 9,070,125 B1
(45) Date of Patent: *Jun. 30, 2015

(54) MODE SWITCHING TO PROVIDE SECURITY FOR CASH HANDLING DEVICE

(75) Inventors: Amy Baker Folk, Charlotte, NC (US);
William Thomas Sanders, Denver, NC (US); Daniel Christopher Bohen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/557,045

(22) Filed: Sep. 10, 2009

Related U.S. Application Data

(63) Continuation of application No. 12/183,901, filed on Jul. 31, 2008, now Pat. No. 7,610,215.

(51) Int. Cl.
*G06Q 20/00* (2012.01)
*G06Q 20/04* (2012.01)
*G07F 19/00* (2006.01)
*G07F 17/32* (2006.01)

(52) U.S. Cl.
CPC ............ *G06Q 20/045* (2013.01); *G07F 19/202* (2013.01); *G07F 17/3241* (2013.01)

(58) Field of Classification Search
CPC .. G07F 17/3241; G07F 19/202; G07F 19/203
USPC ................. 235/379, 380, 383; 705/16, 26, 34
See application file for complete search history.

(56) References Cited

U.S. PATENT DOCUMENTS

| | | | |
|---|---|---|---|
| 4,150,740 A * | 4/1979 | Douno | 194/206 |
| 4,567,358 A * | 1/1986 | Takamatsu et al. | 235/379 |
| 7,219,268 B2 * | 5/2007 | Adkisson et al. | 714/55 |
| 7,783,571 B2 * | 8/2010 | Fish et al. | 705/43 |
| 2002/0179401 A1 * | 12/2002 | Knox et al. | 194/217 |
| 2003/0050972 A1 * | 3/2003 | Felt et al. | 709/203 |
| 2008/0033829 A1 * | 2/2008 | Mennie et al. | 705/16 |
| 2009/0236200 A1 * | 9/2009 | Hallowell et al. | 194/215 |

* cited by examiner

*Primary Examiner* — Rokib Masud
(74) *Attorney, Agent, or Firm* — Banner & Witcoff, Ltd.; Michael A. Springs

(57) ABSTRACT

Methods and devices provide mode switching in order to secure cash handling devices. A cash handling device allows a first selection to be input in order to request an exchange transaction. Currency may be inserted into the cash handling device. A display may prompt a user to identify one or more requested denominations of currency. A user may then identify one or more of the requested denominations for the exchange transaction. Elapsed time may be counted after prompting the user to identify denominations. If the elapsed time exceeds a timeout threshold, the transaction may be switched from an exchange transaction to a deposit transaction and the inserted currency may be credited as a deposit into an account. Otherwise, the exchange transaction may proceed and the currency may be provided in the requested denomination.

20 Claims, 5 Drawing Sheets

MODE SWITCHING TO PROVIDE SECURITY FOR CASH HANDLING DEVICE

CROSS-REFERENCE TO RELATED APPLICATIONS

This application claims priority to U.S. non-provisional patent application Ser. No. 12/183,901, filed Jul. 31, 2008, entitled "Mode Switching to Provide Security for Cash Handling Device," hereby incorporated herein by reference as to its entirety.

BACKGROUND

In cash handling devices (e.g., cash recyclers), some transactions are related and may include both the deposit of currency and the withdrawal of currency. As an example, if a cashier needs additional "one dollar" bills or additional "five dollar" bills, the cashier may take some of his or her larger denomination bills and exchange them for the smaller denominations that are needed. Thus, such transactions might not be considered a deposit, but an exchange.

However, in some situations when a user takes too long to complete the withdrawal portion of these transactions or, worse yet, completely forgets to withdraw the currency, the amount of currency in the cash handling device may be inaccurate. In addition, there is an opportunity for theft in these situations.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one embodiment, a user is allowed to make a first selection on a cash handling device in order to request an exchange transaction. Currency may be inserted into the cash handling device. A second selection may be made on the cash handling device to indicate at least one denomination. The exchange transaction may be switched to a deposit transaction if said at least one denomination is not selected within a period of time. The exchange transaction may be allowed to proceed if said at least one denomination is selected within the pre-determined period of time.

In another embodiment, the inserted currency may be credited as a deposit into an account if said at least one denomination is not selected within a pre-determined period of time.

In still another embodiment, the currency may be provided in said at least one denomination if said at least one denomination is selected within the pre-determined period of time.

In yet another embodiment, a first selection may be entered on a cash handling device in order to request an exchange transaction. Currency may be inserted into the cash handling device. A display may provide a prompt to inquire about at least one desired denomination. A second selection may be made on the cash handling device to indicate said at least one denomination. Elapsed time may be counted after displaying the prompt on the cash handling device. The exchange transaction may be switched to a deposit transaction if the elapsed time exceeds a timeout threshold. The exchange transaction may proceed if the elapsed time is less than the timeout threshold. The inserted currency may be credited as a deposit into an account if the elapsed time exceeds the timeout threshold. The currency may be provided in the requested denominations if the elapsed time is less than the timeout threshold.

In addition, the foregoing embodiments can be implemented in an apparatus that includes a processor for executing computer executable instructions, memory that stores the computer executable instructions, an input means for receiving user input, a display for displaying information to the user and, optionally, to receive input from a user. Each of the above-identified method steps can be implemented as computer-executable instructions that are stored in the memory and executed by the processor.

In still another embodiment, the cash handling device may be a cash recycler.

In another embodiment, an input means and display may include a touch sensitive screen.

In yet another embodiment, the input means may include a touch-sensitive screen.

In still another embodiment, the display may include a touch sensitive screen.

In other embodiments, the input means may include a keypad or keyboard.

Additional features and advantages of the invention will be apparent upon reviewing the following detailed description.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, systems and methods are illustrated for providing mode switching in order to secure cash handling devices.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
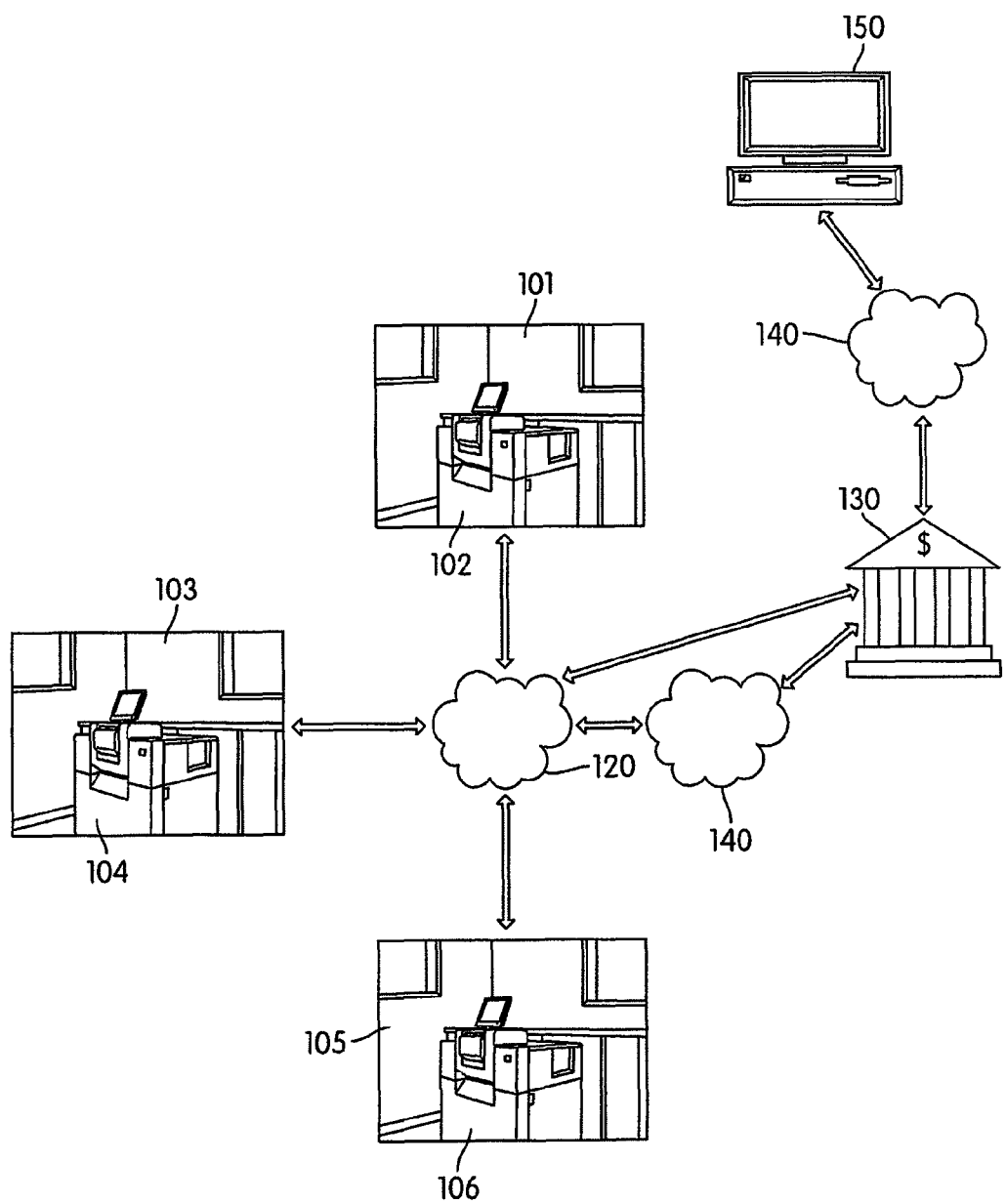
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, invalid reproductions, denomination, type of currency (e.g., which country the currency originates from) and the like. Scanning unit 207 may further be configured to refuse money (either through input slot 209 or withdrawal slot 211) if it cannot be properly recognized or if the currency is deemed to be an invalid reproduction. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 2:
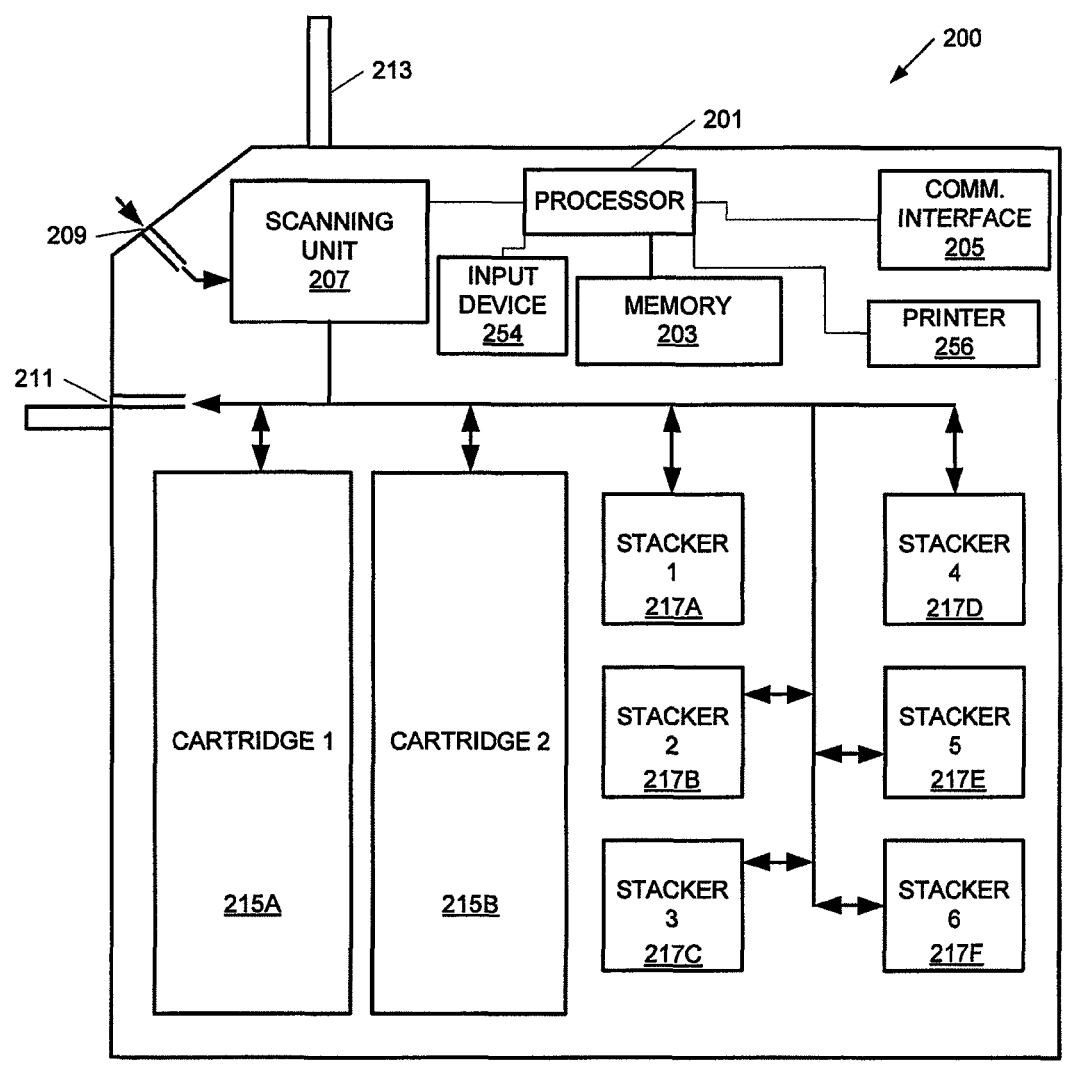
FIG. 2 illustrates a simplified diagram of a cash handling device in accordance with an aspect of the invention.
Figure 3:
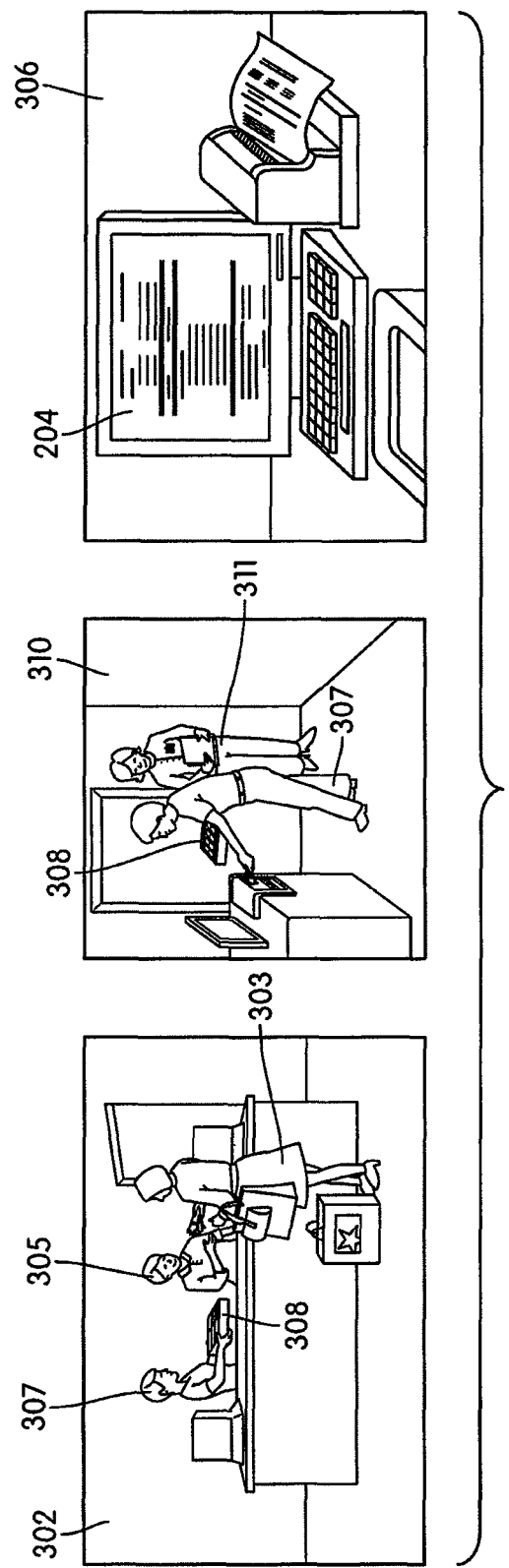
FIG. 3 illustrates various features of a cash handling device that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
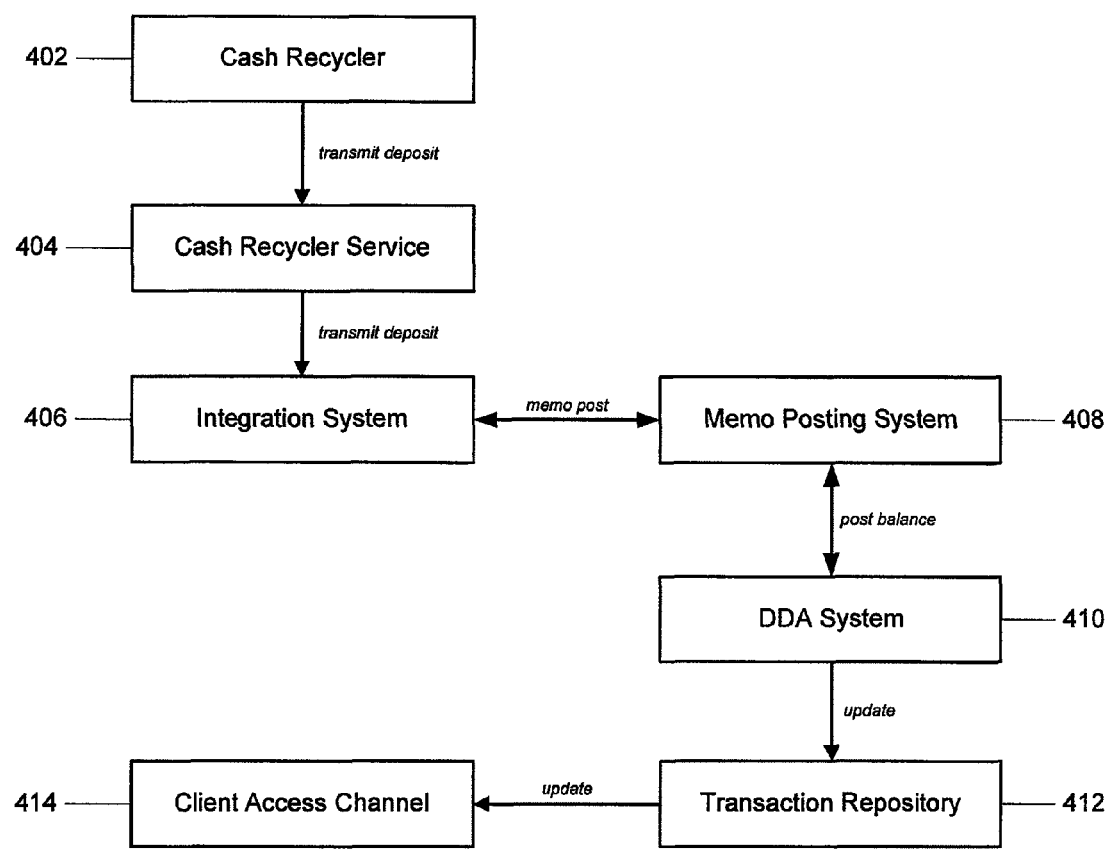
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
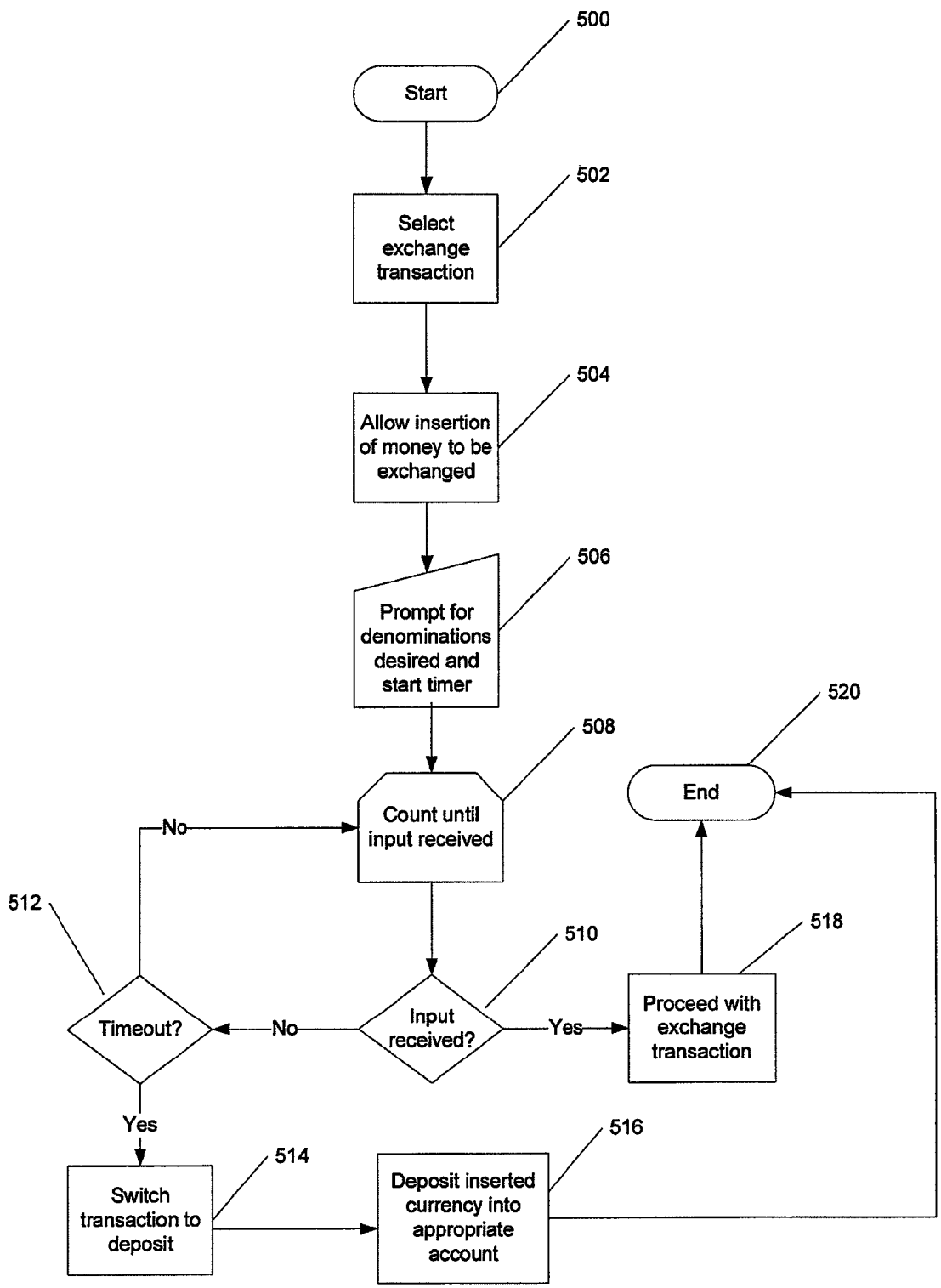
FIG. 5 illustrates an example method of implementing mode switching to provide security for a cash handling device.

FIG. 5 illustrates an example method of implementing security in order to prevent transaction activity until an audit is complete. Upon start 500, a cash handling device (e.g., cash recycler, or the like) 102, 104, 106 may receive an input from a user 307. This input may allow a user to indicate that an exchange transaction is desired 502. The input may be received from a keypad, keyboard, pressing an applicable portion or button of a touch-sensitive display, a barcode scanner, magnetic card reader, use of a proximity card, or the like.

After an input is received indicating that an exchange transaction is desired 502, the cash handling device may allow currency to be inserted 504. The cash handling device may prompt the user to identify one or more denominations of currency that are desired for withdrawal 506.

A timer may be implemented in software or hardware. The timer may count the amount of time that has elapsed 508 since the user was prompted to select denomination(s) 508. Alternatively, the amount of elapsed time may be counted beginning at other times or triggers. For example, the timer may begin counting the amount of elapsed time when user 510 begins the exchange transaction. In another example, the timer may begin counting upon user 510 inserting the currency to be exchanged. If input is received from the user 510, then the cash handling device may proceed with the exchange transaction 518. This may include, for example, dispensing the currency in the requested denomination(s). If input is not received 510, then the system may continue to count elapsed time 508 until a timeout threshold is reached 512. The timeout threshold may be pre-determined. Alternatively, the timeout may be context sensitive with more time being allowed depending on the type of transaction that is selected. The timeout threshold may also be selectable or programmable by a person authorized to make changes to the cash handling device.

If a timeout threshold is met or exceeded, the cash handling device may automatically switch the transaction from an exchange transaction to a deposit transaction 514. Currency that was deposited into the cash handling device may then be deposited or credited to an appropriate account 516 such as, for example, a retailer's account, a user's account, a temporary account, an overflow account, or another type of account. In one or more arrangements, the cash handling device may transmit the deposit information to the financial institution for immediate (i.e., real-time) recognition. At this point, the process on the cash handling device may end 520. The cash handling device may switch the transaction in such a manner to protect the integrity and the security of the funds inserted into the cash handling device.

A timeout threshold according to aspects described herein may also be used at other point in an exchange transaction and for various other transactions where money is to be withdrawn from the cash handling device or an account. For example, a timeout threshold may be used for foreign currency exchange transactions so that funds will automatically be deposited if the currency exchange transaction is not completed within a certain timeout period.

Additionally or alternatively, the cash handling device, upon automatically switching a transaction to a deposit, may store a notification that the deposit was performed based on the timeout period being exceeded. The notification or indication may be transmitted to the financial institution for recordkeeping and/or to a business manager or other employee to notify them of the situation.

In other embodiments, bank 130 or another institution may utilize an infrastructure which includes a server 150 having components such as a memory, a processor, a display, and a communication interface in order to communicate what a timeout or threshold should be. Bank 130 or another institution may also optionally determine when a timer or a timeout should be triggered and notify the cash handling device accordingly.

In still other embodiments, bank 130 or another institution may make determinations at any time for any reason that the mode of the cash handling device should be changed from the mode of its current transaction type to a deposit transaction for security or other appropriate reason. Again, server 150 may utilize a communication interface in order to communicate this type of mode change to the cash handling device.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A cash handling device comprising:
    a processor;
    a scanning unit configured to scan currency that is inserted into the cash handling device;
    one or more stackers configured to store and organize currency based on denomination;
    a communication interface; and
    memory storing machine executable instructions that, when executed by the processor, cause the cash handling device to:
        receive a first selection that indicates a request for an exchange transaction;
        enable inserted currency to be inserted into the cash handling device by a user of the cash handling device;
        determine whether a second selection is received that indicates at least one denomination;
        switch from the exchange transaction to a deposit transaction if the at least one denomination is not selected within a pre-determined period of time, wherein:
            the exchange transaction and the deposit transaction are separate transactions that are conditionally performed by the cash handling device for the inserted currency during a single transaction occurrence;
            the exchange transaction causes the cash handling device to exchange returned currency having the at least one denomination for the inserted currency; and
            the deposit transaction causes the cash handling device to credit an account for the inserted currency; and
        perform only one of the exchange transaction and the deposit transaction for the inserted currency,
    wherein performing only of the exchange transaction and the deposit transaction for the inserted currency includes:
        performing the exchange transaction if the at least one denomination is selected within the pre-determined period of time; and
        performing the deposit transaction if the at least one denomination is not selected within the pre-determined period of time,
    wherein performing the deposit transaction includes transmitting, via the communication interface, deposit information associated with the inserted currency to a financial institution for immediate, real-time recognition, and
    wherein the deposit information associated with the inserted currency that is transmitted to the financial institution for immediate, real-time recognition is configured to cause the financial institution to apply a non-provisional credit that is not conditioned on the inserted currency being transported from a client site where the cash handling device is located to the financial institution, the non-provisional credit being applied to a client account associated with the cash handling device.

2. The cash handling device of claim 1, wherein the memory stores additional instructions that, when executed by the processor, further cause the cash handling device to:
    provide the currency in the at least one denomination if the at least one denomination is selected within the pre-determined period of time.

3. The cash handling device of claim 1, wherein the cash handling device further comprises a display.

4. The cash handling device of claim 3, wherein the memory stores additional instructions that, when executed by the processor, further cause the cash handling device to:
    display a prompt on the display to inquire about the at least one denomination;
    enable the exchange transaction to proceed if an elapsed time is less than a timeout threshold;
    cause the deposit transaction to be performed if the elapsed time exceeds the timeout threshold; and
    cause the exchange transaction to be performed if the elapsed time is less than the timeout threshold.

5. The cash handling device of claim 4, wherein the memory stores additional instructions that, when executed by the processor, further cause the cash handling device to:
    count the elapsed time after displaying the prompt.

6. The cash handling device of claim 4, wherein the memory stores additional instructions that, when executed by the processor, further cause the cash handling device to:
    count the elapsed time upon the user of the cash handling device inserting the currency.

7. The cash handling device of claim 4, wherein the memory stores additional instructions that, when executed by the processor, further cause the cash handling device to:
    enable the timeout threshold to be selectable.

8. The cash handling device of claim 4, wherein the memory stores additional instructions that, when executed by the processor, further cause the cash handling device to:
    determine the timeout threshold based on a transaction type.

9. The cash handling device of claim 4, wherein the timeout threshold is context sensitive, and wherein the cash handling device is configured to increase the timeout threshold based on a specific type of transaction being selected.

10. The cash handling device of claim 3, wherein the display comprises a touch-sensitive screen.

11. The cash handling device of claim 1, further comprising:
    an input device configured to receive a user input.

12. The cash handling device of claim 11, wherein the input device comprises a touch-sensitive screen.

13. The cash handling device of claim 11, wherein the input device comprises a keypad.

14. The cash handling device of claim 1, wherein the memory stores additional instructions that, when executed by the processor, further cause the cash handling device to:
    when the at least one denomination is not selected within the pre-determined period of time, insert an indication in a message transmitted to a separate apparatus of a business, wherein the indication is indicative that the deposit transaction was performed based on the pre-determined period of time being exceeded.

15. The cash handling device of claim 1, further comprising:
    one or more cartridges configured to store overflow currency;
    an input slot;
    a withdrawal slot; and one or more electromechanical systems for automatically transferring currency between the one or more stackers, the one or more cartridges, the input slot, and the withdrawal slot.

16. A non-transitory computer-readable storage medium storing computer-executable instructions that, when executed by a processor included in a cash handling device, cause the cash handling device to:
   receive a first selection that indicates a request for an exchange transaction;
   enable inserted currency to be inserted into the cash handling device by a user of the cash handling device;
   determine whether a second selection is received that indicates at least one denomination;
   switch from the exchange transaction to a deposit transaction if the at least one denomination is not selected within a pre-determined period of time, wherein:
      the exchange transaction and the deposit transaction are separate transactions that are conditionally performed by the cash handling device for the inserted currency during a single transaction occurrence;
      the exchange transaction causes the cash handling device to exchange returned currency having the at least one denomination for the inserted currency; and
      the deposit transaction causes the cash handling device to credit an account for the inserted currency; and
   perform only one of the exchange transaction and the deposit transaction for the inserted currency,
   wherein the cash handling device further comprises a scanning unit configured to scan currency that is inserted into the cash handling device, one or more stackers configured to store and organize currency based on denomination, and a communication interface,
   wherein performing only of the exchange transaction and the deposit transaction for the inserted currency includes:
      performing the exchange transaction if the at least one denomination is selected within the pre-determined period of time; and
      performing the deposit transaction if the at least one denomination is not selected within the pre-determined period of time,
   wherein performing the deposit transaction includes transmitting, via the communication interface, deposit information associated with the inserted currency to a financial institution for immediate, real-time recognition, and
      wherein the deposit information associated with the inserted currency that is transmitted to the financial institution for immediate, real-time recognition is configured to cause the financial institution to apply a non-provisional credit that is not conditioned on the inserted currency being transported from a client site where the cash handling device is located to the financial institution, the non-provisional credit being applied to a client account associated with the cash handling device.

17. The non-transitory computer-readable storage medium of claim 16, having additional computer-executable instructions stored thereon that, when executed by the processor included in the cash handling device, further cause the cash handling device to:
   providing the currency in the at least one denomination if the at least one denomination is selected within the pre-determined period of time.

18. The non-transitory computer-readable storage medium of claim 16, having additional computer-executable instructions stored thereon that, when executed by the processor included in the cash handling device, further cause the cash handling device to:
   display a prompt to inquire about the at least one denomination;
   count elapsed time after displaying the prompt;
   enable the exchange transaction to proceed if the elapsed time is less than a timeout threshold;
   cause the deposit transaction to be performed if the elapsed time exceeds the timeout threshold; and
   cause the exchange transaction to be performed if the elapsed time is less than the timeout threshold.

19. The non-transitory computer-readable storage medium of claim 16, having additional computer-executable instructions stored thereon that, when executed by the processor included in the cash handling device, further cause the cash handling device to:
   when the at least one denomination is not selected within the pre-determined period of time, insert an indication in a message transmitted from the cash handling device, wherein the indication is indicative that the deposit transaction was performed based on the pre-determined period of time being exceeded.

20. A method comprising:
   receiving, by a cash handling device comprising at least one processor and memory storing instructions, a first selection that indicates a request for an exchange transaction, wherein the cash handling device further comprises a scanning unit configured to scan currency that is inserted into the cash handling device, one or more stackers configured to store and organize currency based on denomination, and a communication interface;
   enabling, by the cash handling device, inserted currency to be inserted into the cash handling device by a user of the cash handling device;
   determining, by the cash handling device, whether a second selection is received that indicates at least one denomination;
   switching, by the cash handling device, from the exchange transaction to a deposit transaction if the at least one denomination is not selected within a pre-determined period of time; wherein:
      the exchange transaction and the deposit transaction are separate transactions that are conditionally performed by the cash handling device for the inserted currency during a single transaction occurrence;
      the exchange transaction causes the cash handling device to exchange returned currency having the at least one denomination for the inserted currency; and
      the deposit transaction causes the cash handling device to credit an account for the inserted currency; and
   performing only one of the exchange transaction and the deposit transaction for the inserted currency,
   wherein performing only of the exchange transaction and the deposit transaction for the inserted currency includes:
      performing the exchange transaction if the at least one denomination is selected within the pre-determined period of time; and
      performing the deposit transaction if the at least one denomination is not selected within the pre-determined period of time,
   wherein performing the deposit transaction includes transmitting, via the communication interface, deposit information associated with the inserted currency to a financial institution for immediate, real-time recognition, and wherein the deposit information associated with the inserted currency that is transmitted to the financial institution for immediate, real-time recognition is configured to cause the financial institution to apply a non-provisional credit that is not conditioned on the inserted currency being transported from a client site where the cash handling device is located to the financial institution, the non-provisional credit being applied to a client account associated with the cash handling device.

* * * * *